United States Patent [19]

Emilsson

[11] Patent Number: 5,183,306
[45] Date of Patent: Feb. 2, 1993

[54] RAIL VEHICLE WHEEL

[75] Inventor: Fred S. Emilsson, Trelleborg, Sweden

[73] Assignee: SAB Wabco Holdings B.V., Sweden

[21] Appl. No.: 933,913

[22] Filed: Aug. 27, 1992

Related U.S. Application Data

[63] Continuation of Ser. No. 802,294, Dec. 4, 1991, abandoned.

[30] Foreign Application Priority Data

Dec. 5, 1990 [SE] Sweden .................. 9003863

[51] Int. Cl.$^5$ .............................. B60B 19/00
[52] U.S. Cl. .............................. 295/11; 295/7
[58] Field of Search .............. 295/1, 7, 11, 15, 18, 295/20; 152/40, 41, 47

[56] References Cited

U.S. PATENT DOCUMENTS

| 1,452,547 | 4/1923 | Call et al. | 295/11 |
| 1,840,898 | 1/1932 | Gunn | 295/11 |
| 2,005,302 | 6/1935 | Saurer | 295/11 |
| 2,168,900 | 8/1939 | Eaton | 295/11 |
| 2,800,357 | 7/1957 | Boschi | 295/11 |
| 2,954,259 | 9/1960 | Kordes | 295/11 |

FOREIGN PATENT DOCUMENTS

| 857302 | 7/1949 | Fed. Rep. of Germany | 295/11 |
| 315915 | 1/1990 | Sweden. | |

Primary Examiner—Russell D. Stormer
Attorney, Agent, or Firm—Laurence R. Brown

[57] ABSTRACT

A rail vehicle wheel comprises a wheel center (1), a flanged tire (2), a rubber ring (3) between the wheel center and the tire, and a pressure ring (4). The rubber ring consists of an annular, axial body (3') and at each side thereof a flange (3"), which forms an angle of for example 60° with the wheel axis.

4 Claims, 1 Drawing Sheet

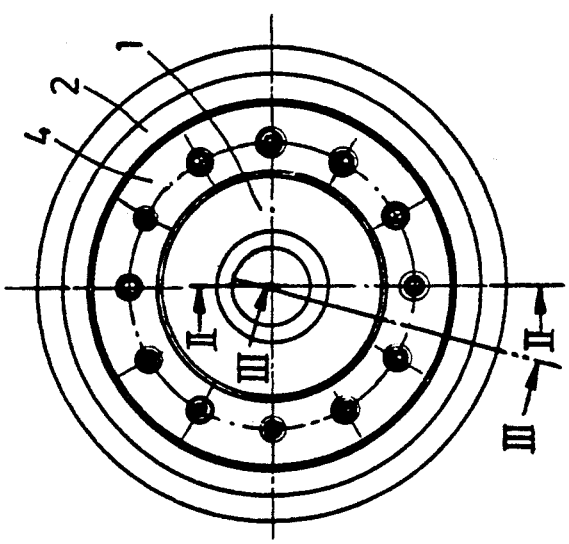
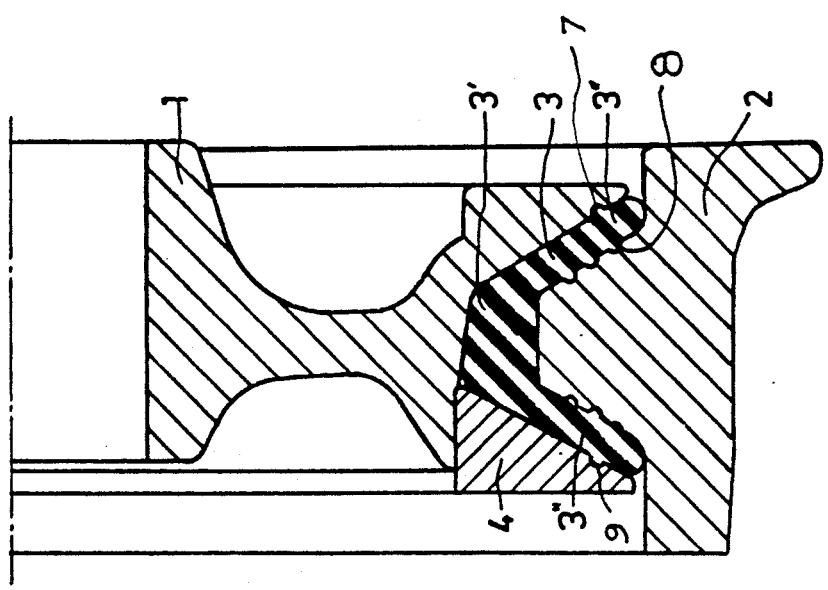
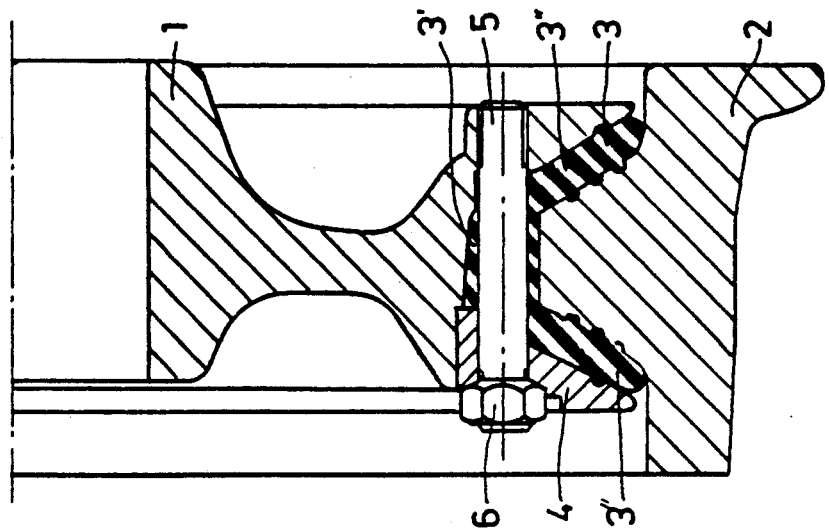

RAIL VEHICLE WHEEL

This application is a continuation of application Ser. No. 07/802,294, filed Dec. 4, 1991, now abandoned.

TECHNICAL FIELD

This invention relates to a rail vehicle wheel, comprising a wheel center, a flanged tyre, and a rubber ring, which is disposed between the wheel center and the tire and which is held in position by a pressure ring.

BACKGROUND OF THE INVENTION

A conventional example of the above tire of rail vehicle wheel is the so called V-wheel, where two rubber rings forming a very open V with each other are arranged between the wheel center and the tire. The angle between each rubber ring and the axis of the wheel may typically be 30°. The rubber rings are primarily exposed to pressure under operation, and the resiliency of the wheel is very low, typically 0.1 mm. The primary purpose of the wheel is to be sound-dampening. Due to the characteristic of the rubber material the resiliency in the axial direction, where the rubber is exposed to shear, is considerable, which is a drawback.

In another design a number of rubber elements are arranged in circumferential rings between the wheel center and the tire and are operating in shear, which provides a good resiliency. A wheel of this design is, however, relatively complicated and expensive, especially if high loads are to be handled.

Generally speaking, the object of the invention is to accomplish a wheel having the simple and comparatively cheap design of the conventional V-wheel but having a greater resiliency in the radial direction (and better stiffness in the axial direction). It is also imperative that a new wheel has the ability to carry great loads.

All of the above objects cannot be reached in the already known way of increasing the angle between each rubber ring and the wheel axis, so that the ring is more exposed to shear than to pressure under operation. Not even by combining the two rubber rings into one and increasing the angle as above stated it is possible to reach the objectives; such a design is shown in SE-B-315 915, which is the closest prior art.

THE INVENTION

In order to attain all of the desired objectives a wheel of the above stated kind is according to the invention characterized in that the rubber ring consist of an annular, axial body, which does not completely fill the space afforded to it between the wheel center and the tire, and at each side thereof a flange, which forms an obtuse angle, preferably 60°, with the wheel axis and is slightly compressed when mounted.

The rubber ring flanges—by being exposed at operation to a combination of shear (to a larger extent) and pressure (to a lesser extent)—will give the wheel a resiliency of for example 0.5–1 mm or more but also a satisfactory stiffness in the axial direction. If the wheel is exposed to higher loads, the annular body will be exposed to pressure giving the wheel a progressive spring characteristic. In the conventional V-wheel the rubber rings are virtually only active in the vicinity of the contact point between the wheel and the rail, whereas in the present design the rubber flanges will be active practically around the whole wheel at rotation.

In the conventional V-wheel the screw joints attaching the pressure ring to the wheel center and thus keeping all parts together are placed radially inside the rubber rings. Also in the present design the pressure ring is attached to the wheel center by a number of screw joints evenly distributed around the wheel, but here the screw of each screw joint extends through a hole in the annular body of the rubber ring, whereby a two-fold purpose is accomplished: undesired circumferential movements of the rubber ring are prevented and a very space-effective design is obtained.

A further security against undesired mutual movements between rubber and metal (slip and creep) also in radial direction is according to the invention obtained in that surfaces of the wheel center, tire and/or pressure ring intended to cooperate with the rubber ring flanges are provided with annular grooves.

A further feature of the wheel according to the invention is that the substantially axial surface of the wheel center in contact with the annular body of the rubber ring is slightly tapered. In this way a certain compensation for the axial force from the contact of the wheel flange with the rail on which the wheel rolls is obtained and also a guiding for the rubber ring at the mounting.

BRIEF DESCRIPTION OF THE DRAWING

The invention will be described in further detail below reference being made to the accompanying drawing, in which FIG. 1 is a side view of a wheel according to the invention, FIGS. 2 and 3 are cross-sectional views (to a larger scale) through this wheel along the lines II—II and III—III in FIG. 1, and FIG. 4 is a corresponding cross-sectional view through a rubber ring before mounting.

DETAILED DESCRIPTION OF A PREFERRED EMBODIMENT

A rail vehicle wheel according to the invention consists primarily of a wheel center 1, a flanged tire 2, a rubber ring 3, and a pressure ring 4.

The rubber ring 3 has a substantially annular body 3', from which two thinner flanges 3" extend towards the wheel tread (when fitted).

The pressure ring 4, which has a press fit in relation to the wheel center 1, is mounted to the wheel center by means of screw joints, preferably evenly distributed around the wheel as shown in FIG. 1. Each screw joint consists of a stud or screw 5, which is initially securely fastened to the wheel center 1, and a nut 6. The stud 5, which extends through the annular body 3' of the rubber ring 3, is comparatively slender, and the engagement between the nut 6 and the press ring 4 is over conical surfaces; these factors enhance flexibility and decrease the requirement on fine tolerances.

As shown in FIGS. 2 and 3, there are annular grooves 7, 8, 9 respectively in the metal surfaces of the wheel center 1, the tire 2 and the press ring 4 in contact with the rubber ring 3, whereas the corresponding surfaces of the rubber ring are even, as shown in FIG. 4, which shows the rubber ring before mounting. At mounting the rubber will be pressed into these grooves increasing the contact surface between rubber and metal, so that mutual slip and creep will be diminished.

As shown in FIG. 4 the annular body 3' of the rubber ring 3 may have annular recesses, so that even after the compression occurring at mounting, which may be in the region of 10–20%, the space provided by the metal parts in this region is not completely filled with rubber. Likewise the diameter of the studs 5 is less than the diameter of the corresponding holes in the rubber ring 3. In this way a pressure increase in this area is obviated.

Rubber has the ability to withstand twice as high forces under pressure as under shear. By choosing the angle between the wheel axis and each rubber flange 3" at 60° the geometry automatically leads to maximum twice as high forces in the annular body 3' exposed to pressure as in the flanges 3" exposed to shear.

By the geometry of the rubber ring 3 having a rather wide annular body 3', the tire 2 has a big cross-sectional area inside the flanges 3", so that the tire—even after substantial wear—has great strength and stiffness with increased safety and advantageous pressure distribution in the rubber as result.

The mounting of the wheel is simple: the rubber ring 3 is first mounted on the tire 2, whereupon the assembly is placed on the wheel center 1 with the pre-mounted studs 5 extending through the holes in the rubber ring 3, and as the last step the pressure ring 4 is mounted and attached (to contact against an abutment in the wheel center 1) by the nuts 6, so that the desired prestress in the rubber is obtained and rubber material is pressed into the grooves in the metal parts. In the shown case there are three grooves at the inner side of each rubber ring flange 3" and one at the outer side; these numbers may vary.

The rubber ring 3 is completely symmetrical before mounting, as appears from FIG. 4. However, as shown from FIGS. 2 and 3 that the substantially axial surface of the wheel center 1 in contact with the annular body 3' of the rubber ring 3 has a certain inclination or taper, which has the twofold purpose of simplifying the mounting (by accomplishing a guiding) and providing a certain lateral force compensating for the lateral force emanating from the cooperation between the wheel flange (on the tire 2) and the rail on which the wheel runs.

By the fact that the studs 5 extend through the rubber ring 3, the latter will effectively be prevented from undesired rotational movements, while at the same time a very space-effective design is obtained. Greater safety against rotational movements may be attained by initially cementing the rubber ring 3 to the tire 2.

In a conventional V-wheel design, where two rubber rings are arranged between a wheel center and a tire in a V configuration and where the angle that each ring forms with the wheel axis is much smaller than in the present design, say 30° or less, the rubber is primarily exposed to pressure, which gives the wheel only a small resiliency in the radial direction and greater and undesired resiliency in the axial direction, where the rubber is more exposed to shear.

In the present design only the rubber in the rubber ring flanges 3" is active in normal operation of the wheel, as the annular body 3' does not completely fill the space afforded to it. Due to the fact that the rubber in the flanges 3" mainly operates in shear, where the material is more resilient, a greater elasticity in the radial direction is obtained than in the conventional design and a greater stiffness in the axial direction. Only when the wheel is exposed to greater loads, the rubber ring body 3' will start to cooperate more actively under pressure and give the wheel a progressive spring characteristic.

In the conventional V-wheel design the rubber rings are compressed only in the vicinity of the contact point between the wheel and the rail and are practically idling during the remainder of each rotational turn, whereas in the present design the shear forces act (in different directions) on practically the whole rubber flanges 3", which leads to a more even distribution of the loads and stresses.

In the shown and described design the rubber flanges 3" are directed towards the tire 2; it is within the scope of the claims to arrange the rubber ring with the flanges directed towards the wheel center.

I claim:

1. A rail vehicle wheel with an axis, comprising in combination a wheel center (1) with a lateral inner surface coaxially arranged about the wheel axis, a flanged tire (2) also with a lateral inner surface coaxially arranged about the wheel axis, a pressure ring (4) and an integral single rubber ring (3), which is disposed between the wheel center and tire as the sole medium for diminishing circumferential creep and which is held in position by said pressure ring (4), wherein the rubber ring (3) consists of an annular, axial body (3') of substantially rectangular cross section in contact with said lateral surfaces of the wheel center and tire and disposed between the wheel center (1) and the tire (2), and said rubber ring (3) further has flanges (3") extending outside the tire lateral surface from the rectangular cross section toward the tire to form an obtuse angle with the wheel axis.

2. A wheel according to claim 1, where the pressure ring (4) is attached to the wheel center (1) by a number of screw joints evenly distributed around the wheel in a single ring, characterized in that a screw (5) of each screw joint extends through a hole in the rectangular cross section portion (3') of the rubber ring and respective holes in the wheel center and pressure ring positioned toward the wheel axis from the tire, thereby (3) to hold the rubber ring circumferentially in place on the wheel center.

3. A wheel according to claim 1, characterized in that surfaces of the wheel center (1) and on opposite sides of the tire (2) engage the rubber ring flanges (3") and are provided with a plurality of annular grooves for frictionally engaging the flanges thereby to restrict circumferential movement of the tire.

4. A rail vehicle wheel with an axis, comprising a wheel center (1), a flanged tire (2), a pressure ring (4) and an integral single rubber ring (3), which is disposed between the wheel center an tire and which is held in position by said pressure ring (4), characterized in that the rubber ring (3) consists of an annular, axial body (3') of substantially rectangular cross section in contact with lateral surfaces of the wheel center and tire disposed between the wheel center (1) and the tire (2), said rubber ring (3) having flanges (3") extending from the rectangular cross section toward the tire to form an obtuse angle with the wheel axis, wherein a lateral surface of the wheel center (1) in contact with the annular body (3') of the rubber ring (3) is slightly tapered.

* * * * *